(No Model.) 2 Sheets—Sheet 1.

A. L. SILVERNAIL.
GEOGRAPHICAL CLOCK.

No. 425,833. Patented Apr. 15, 1890.

Witnesses
Inventor
Alpheus L. Silvernail.
By his Attorneys
Moulton & Rogers.

(No Model.) 2 Sheets—Sheet 2.

A. L. SILVERNAIL.
GEOGRAPHICAL CLOCK.

No. 425,833. Patented Apr. 15, 1890.

Witnesses

Inventor
Alpheus L. Silvernail.
By his Attorney
Moulton & Rogers.

UNITED STATES PATENT OFFICE.

ALPHEUS L. SILVERNAIL, OF IONIA, MICHIGAN.

GEOGRAPHICAL CLOCK.

SPECIFICATION forming part of Letters Patent No. 425,833, dated April 15, 1890.

Application filed September 19, 1889. Serial No. 324,438. (No model.)

*To all whom it may concern:*

Be it known that I, ALPHEUS L. SILVERNAIL, a citizen of the United States, residing at Ionia, in the county of Ionia and State of Michigan, have invented certain new and useful Improvements in Geographical Globes; and I do hereby declare the following to be a full, clear, and exact description of the invention, such as will enable others skilled in the art to which it appertains to make and use the same.

My invention relates to a globe for indicating longitude and time, and is designed as an educational school apparatus for primary schools; and it consists in the construction, combination, and arrangement of parts hereinafter described, and particularly pointed out in the claims, reference being had to the accompanying drawings, wherein—

Figure 1:
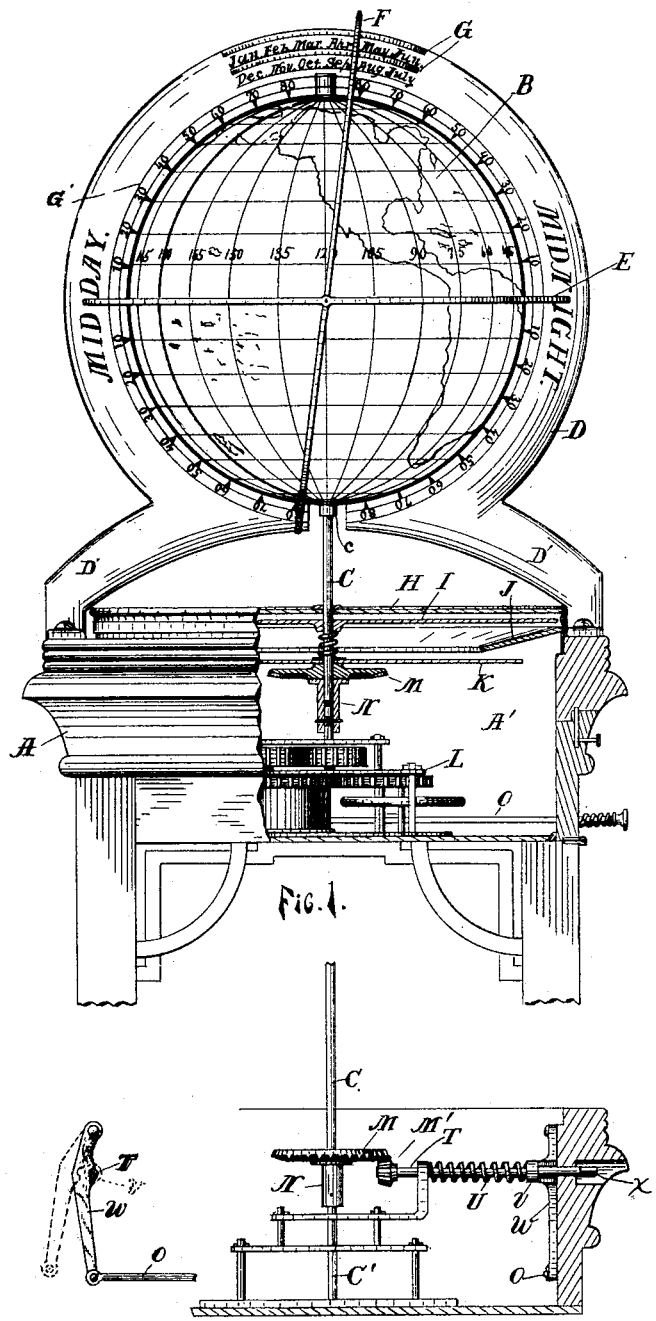
Figure 2:
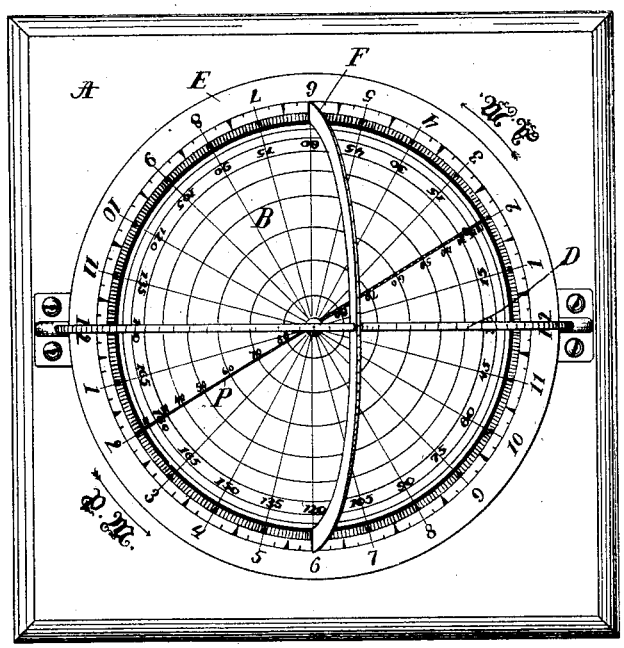
Figure 3:
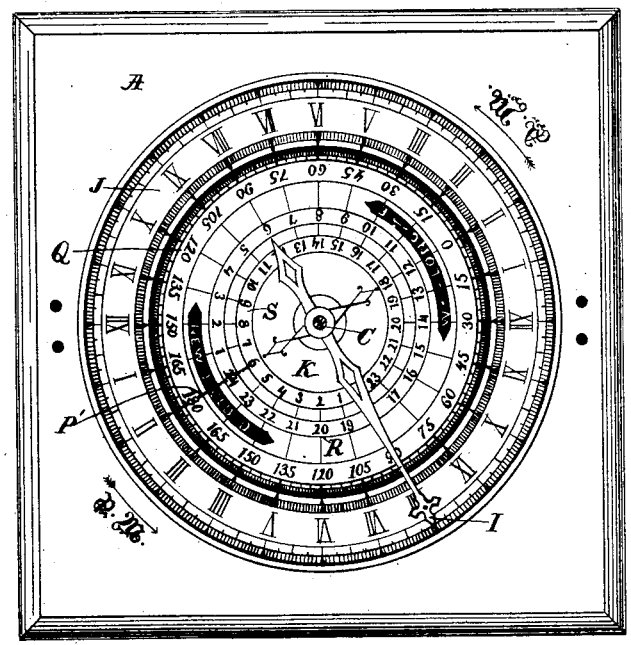

Figure 1 represents a side elevation of a device embodying my invention, with the stand partly in section to show details; Fig. 2, a plan of the same; Fig. 3, a plan of the table-top with the globe removed to show dials, &c.; and Fig. 4, a detail of the setting mechanism.

Like letters and figures indicate like parts throughout the drawings.

A represents a stand of any suitable design for supporting the globe, and is provided with a chamber A' for containing the operating mechanism and machinery.

B is the globe, its surface representing the earth, and having marked thereon the parallels of latitude and meridians of longitude in the usual manner, preferably ten and fifteen degree spaces, as shown in the drawings.

C is a spindle constituting the axis of the globe, is journaled in D at its upper end, (the north pole of the globe,) is provided with a friction-collar c, having a flange projecting from its upper face, upon which the globe rests, and, passing through the glass plate H, is also provided with a bevel-wheel M and rests upon a friction-clutch N, from which it receives motion by friction communicated by the shaft C', which is actuated by clock-work mechanism L. A polar circle or frame D, having legs D', by which it is secured to the stand-top, incloses the globe, one segment being lettered "Midnight," the opposite "Midday," for indicating the light and dark side of the globe. At the top of frame D is placed a scale G, containing the names of the months of the year and marks for the days of each month, all of the winter months being arranged upon one side of the pole, the summer months upon the opposite side, for the purpose of indicating the proper adjustment of the polar circle F to indicate the hours of sunset and sunrise at different seasons, as hereinafter explained. The scale G' upon the inside edge of frame D corresponds to the parallels of latitude marked on the surface of the globe, is merely a duplicate of the numbering of said parallels on the surface of the globe, and is arranged upon frame D for greater convenience only.

E is an equatorial circle secured to frame D, and is also provided with a scale, Fig. 2, which is merely a duplicate of the clock-dial shown in Fig. 3, the positions of the numbers upon the latter being duplicated upon the former also, for greater convenience of reference.

F represents a polar circle pivoted to circle or frame E, and arranged at right angles to frame D, for separating the light side of the globe from the dark side, and indicating the hour of sunset and sunrise at any point on the earth's surface at any given time when set at right angles to the plane of the ecliptic.

H is a glass plate covering the dials; I, the index secured to the spindle and moving with it.

J is a stationary dial secured to the stand-top, having a twenty-four-hour circle divided into twelve hour-segments numbered from 1 to 12 and marked a. m. and p. m. respectively, provided with an outer minute-circle divided into proper fractions of hours, and an inner circle divided into three hundred and sixty degrees, corresponding with the degree-circle Q upon the card K, which consists of a circular plate or card of any suitable material secured to spindle C and revolving with it, and upon which are placed three circular scales Q, R, and S, and an outer three-hundred-and-sixty-degree circle corresponding with a like circle upon dial J, above referred to.

The purpose of the card is to produce in duplicate certain indications found upon the globe for more ready reference. The outer scale Q corresponds to the scale of the meridians of longitude, as indicated upon the surface of the globe, Fig. 2.

P indicates the day-line upon the globe, Fig. 2, and P' indicates its corresponding position upon the card, Fig. 3. Starting from the principal meridian 0, the segments to the right and left are divided into fifteen degree-spaces east and west, as shown by the arrows. The scale S has twenty-four spaces, numbered from 1 to 24, inclusive, and its function is to indicate the time elapsed since the ninetieth meridian passed any given fixed point—in other words, the number of hours that have elapsed since midnight, midday, sunrise, sunset, &c.—and the scale R is for indicating the number of hours that have elapsed since the one hundred and eightieth meridian has passed any like fixed point for a like purpose relative to the astronomical day.

L represents any suitable clock-work mechanism for causing a continuous revolution of the spindle C. The globe is loosely mounted upon the spindle, so as to be operated automatically by the friction of collar $c$; or it may be independently moved by hand. The device is also adapted to be operated by hand independent of the clock-work. The friction-coupling N operates the spindle automatically, being actuated by the clock. The bevel-wheel M is also secured to the spindle, and may be operated by the hand-actuated shaft T, having pinion M', engaging with wheel M, and having the end $x$ squared to fit a key inserted from outside. For throwing this independently-acting device in and out of gear, a spring U and latch W, a rod O, and a collar V are provided. Pushing in upon the shaft T causes pinion M' to engage with wheel M, and drawing the rod O causes latch W to engage latch T, the collar V resting against the face of latch W and holding the parts in the position shown in Fig. 4. Then by pushing the rod O and letting go of shaft T the spring U throws wheel M and pinion M' out of gear.

Having thus described my invention, its operation is as follows: First, to find the hour of sunset or sunrise at any given place upon the surface of the earth at any given time, I find its latitude and longitude upon the globe. I adjust the circle F upon the scale G so as to show upon that scale the day of the month. The arrows upon Figs. 2 and 3 show the direction in which the globe is turning constantly, (from east to west,) and the letters "Midday" upon the circle D in Fig. 1 show upon which side of the globe the sun is supposed to be situated. It is evident that it will be sunrise upon that side of the globe that is moving toward the sun and sunset upon that portion that is moving away from the sun. In the drawings the circle F is adjusted to show sunrise and sunset September 1, Fig. 1, and it will be observed that it intersects the intersection of latitude fifty degrees north, longitude one hundred and five degrees west. Now by tracing the one hundred and fifth meridian down to where it intersects the time-scale on the circle E, Fig. 2, we observe that it falls opposite the figure 7 p. m.; hence the sun set on September 1 at latitude fifty degrees north, longitude one hundred and five degrees west, at seven p. m. To find the hour of sunrise at the same place, turn the globe around till the frame F intersects upon the opposite side, follow the line 105 down to the time-circle, and the figure opposite will give the time of sunrise. For example, in Fig. 2 frame F intersects the forty-fifth meridian east longitude at about the fifty-fifth parallel north latitude, and the figure 5 on the circle E indicates that the sun arose at that point September 1 at five a. m. Second, given the time of day at any point on the globe, to find the time of day at any other point: The drawings, Figs. 2 and 3, indicate that it is eight p. m. on the ninetieth meridian longitude west. To find the time at any other point on the globe, find its longitude, trace the line down to the time-circle E, and the figures found on the time-circle opposite to that meridian indicate the time at that point. For example, Springfield, Illinois, is upon the ninetieth meridian west longitude, Philadelphia, Pennsylvania, is upon the seventy-fifth meridian west longitude, and the figure 9 on the time-circle indicates that when it is eight p. m. at Springfield it is then nine p. m. at Philadelphia. Again, assuming it to be eight p. m. upon the ninetieth meridian at any given point on the globe, say at the equator, to find the number of hours that have passed at that point since midnight, the XII upon the right side of Fig. 3 indicates midnight and is a fixed point outside the globe, and outside the card K, its counterpart, and the figures 20 upon the scale S opposite to said XII indicate that it has been twenty hours since the ninetieth meridian passed the midnight point—in other words, that the local day at the ninetieth meridian is twenty hours old. At the same time the figures 14 upon the scale R indicate that the astronomical day is fourteen hours old, the opposite XII indicating the midday point. The scale S shows that it has been eight hours since the ninetieth meridian passed that point; consequently eight hours since noontime; and at the same time the scale R shows the one hundred and eightieth meridian has passed the midday point two hours, and subtracting fourteen from twenty-four on the scale R shows the number of hours left of the old day. In the same manner the number of hours from any fixed point indicating sunrise, sunset, &c., may be shown by reference to the scales and tables.

Having thus described my invention and its method of operation, what I claim, and desire to secure by Letters Patent of the United States, is—

1. In a geographical globe consisting of a stand, as A, a globe, as B, a frame, as D, provided with a scale arranged upon the face of the same, as G′, an equatorial circle, as E, having a scale provided with numbers, as described, a spindle journaled in frame D, provided with a collar c for supporting said globe and imparting motion thereto, an index, as I, and a plate, as K, provided with scales Q, R, and S, arranged substantially as described, and for the purposes herein set forth.

2. In a geographical globe, in combination with a stand, as A, a globe, as B, a frame, as D, a circle, as E, a spindle, as C, and suitable clock-work mechanism for revolving said spindle, a polar circle, as F, pivoted to circle E, and a scale, as G, arranged upon said frame D, substantially as described, and for the purpose herein set forth.

3. In a geographical globe, and in combination, a globe, as B, a frame, as D, having legs D′ for securing same to a suitable support, an equatorial circle, as E, a polar circle, as F, pivoted to circle E, scales G G′, secured to frame D, a spindle, as C, collar, as c, bevel-wheel M, clutch-coupling N, pinion M′, shaft T, collar V, spring U, latch W, and rod O, all arranged substantially as described, for the independent operation of said device, as set forth.

4. In a geographical globe, and in combination, a globe B, having longitudinal and horizontal lines numbered to indicate the various degrees of latitude and longitude, substantially as described, an inclosing-frame D, provided with suitable supports, and within which said globe is pivoted to revolve horizontally, and having scales G and G′, substantially as described, an equatorial circle E, having a scale, the numbers and spaces upon which correspond to the twenty-four hours of the day, and minutes into which the same are subdivided, rigidly secured to frame D at the equator of said globe, and polar circle F, pivoted to circle E, and adapted to adjust on the scale G, arranged substantially as described, and for the purposes set forth.

In testimony whereof I affix my signature in presence of two witnesses.

ALPHEUS L. SILVERNAIL.

Witnesses:
DENNIS L. ROGERS,
G. W. SHOOK.